United States Patent [19]
Henry et al.

[11] Patent Number: 5,749,700
[45] Date of Patent: May 12, 1998

[54] HIGH SPEED, HIGH TEMPERATURE HYBRID MAGNETIC THRUST BEARING

[75] Inventors: Mark S. Henry, Indianapolis; Brian P. King, Greenwood, both of Ind.

[73] Assignees: Allison Engine Company, Inc.; Allison Advanced Development Company, both of Indianapolis, Ind.

[21] Appl. No.: 682,107

[22] Filed: Jul. 17, 1996

[51] Int. Cl.⁶ ........................................ F01D 3/00
[52] U.S. Cl. ........................... 415/104; 310/90.5
[58] Field of Search .................... 415/104, 107; 310/90.5

[56] References Cited

U.S. PATENT DOCUMENTS

| | | |
|---|---|---|
| 4,059,369 | 11/1977 | Isenberg et al. ............... 415/107 |
| 4,629,261 | 12/1986 | Eiermann et al. . |
| 4,652,780 | 3/1987 | Murakami et al. . |
| 5,021,697 | 6/1991 | Kralick . |
| 5,072,146 | 12/1991 | New ........................... 310/90.5 |
| 5,083,053 | 1/1992 | New . |
| 5,104,284 | 4/1992 | Hustak, Jr. et al. . |
| 5,142,177 | 8/1992 | Higuchi et al. . |
| 5,355,040 | 10/1994 | New . |
| 5,386,166 | 1/1995 | Reimer et al. . |
| 5,445,494 | 8/1995 | Hanson ....................... 415/107 |
| 5,469,007 | 11/1995 | Toyama ....................... 310/90.5 |
| 5,521,448 | 5/1996 | Tecza et al. . |

*Primary Examiner*—John T. Kwon
*Attorney, Agent, or Firm*—Woodard, Emhardt, Naughton, Moriarty & McNett

[57] ABSTRACT

The present invention contemplates a hybrid magnetic bearing thrust disk. In one embodiment the hydrid magnetic bearing thrust disk comprises a high magnetic permeable portion that is supported by a high specific strength circumferential ring. The high specific strength circumferential ring resisting the dynamic loads applied to the hydrid thrust disk.

41 Claims, 8 Drawing Sheets

HIGH SPEED, HIGH TEMPERATURE HYBRID MAGNETIC THRUST BEARING

BACKGROUND OF THE INVENTION

The present invention relates generally to the design and construction of a magnetic thrust bearing arrangement for supporting a rotatable shaft against axially acting forces within a high speed rotating apparatus. More particularly, in one embodiment of the present invention a disk formed of high magnetic permeable material is coupled with a high specific strength composite ring to form a lightweight magnetic thrust bearing rotor. Although, the present invention was developed for use in a gas turbine engine, certain applications may be outside of this field.

It is well known that a gas turbine engine integrates a compressor and a turbine having components that rotate at extremely high speeds in a high temperature environment. One component being a rotor disk that carries a row of airfoils utilized to influence the gaseous flow within the engine. The rotating components typically cooperate with a rotatable shaft and are supported by radial and thrust bearings that must withstand significant dynamic and static loads within a hostile environment. During operation of the gas turbine engine the bearings are subjected to forces including: shock loads—such as from landings; manuever loads—associated with sudden change in direction, and centrifugal forces attendant with the rotating components.

As engine designers continue to increase the efficiency and power output from gas turbine engines the application of magnetic bearings for supporting and controlling the rotor and rotatable shaft becomes desirable. The integration of magnetic bearings into the engine would allow the rotor shaft to be supported by magnetic forces, eliminate frictional forces, along with mechanical wear and the lubrication system.

A magnetic thrust bearing includes a magnetic flux field and a rotatable thrust disk that is acted upon by the magnetic flux field. The application of magnetic bearings in flight-weight gas turbine engines requires a compactness of bearing design which ultimately equates to lighter weight. Prior designers of gas turbine engines have utilized materials for the rotating thrust disk that experience a loss of mechanical properties at elevated temperatures. This loss of mechanical properties limits the maximum rotational speed that the thrust rotor disk can be operated at, thereby effectively limiting the maximum rotating speed of the engine components. Although the prior techniques utilizing magnetic thrust bearings for gas turbine engines are steps in the right direction, the need for additional improvements still remains. The present invention satisfies this need in a novel and unobvious way.

SUMMARY OF THE INVENTION

One form of the present invention contemplates a combination comprising: a gas turbine engine; and a magnetic thrust bearing rotor within the gas turbine engine, comprising; a rotatable magnetically attractable member, and a high specific strength composite ring positioned circumferentially about the magnetically attractable member for resisting non-magnetic forces applied to the magnetically attractable member.

Another form of the present invention contemplates a combination comprising: a gas turbine engine; a mechanical housing within the gas turbine engine; a shaft rotatable within the housing; and an active electromagnetic thrust bearing within the mechanical housing, the active electromagnetic thrust bearing having a magnetically attractable rotor coupled to the shaft and being operable at up to 1200 degrees fahrenheit.

One object of the present invention is to provide an improved magnetic thrust bearing.

Related objects and advantages of the present invention will be apparent from the following description.

BRIEF DESCRIPTION OF THE DRAWINGS

FIG. 5 is an enlarged partial sectional view of the magnetic thrust bearing rotor of FIG. 3a.

DESCRIPTION OF THE PREFERRED EMBODIMENT

Figure 1:
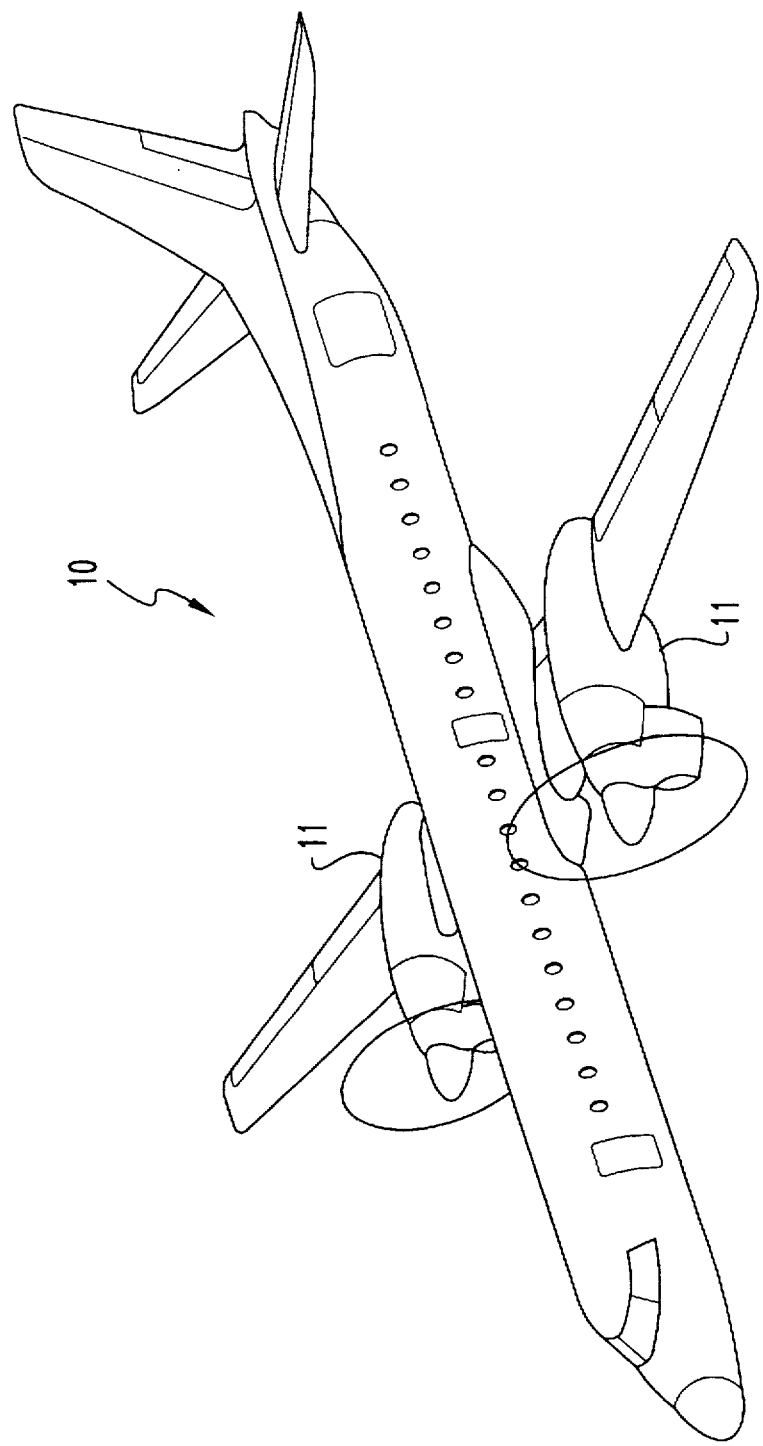
FIG. 1 is a perspective view of an aircraft having a gas turbine engine coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
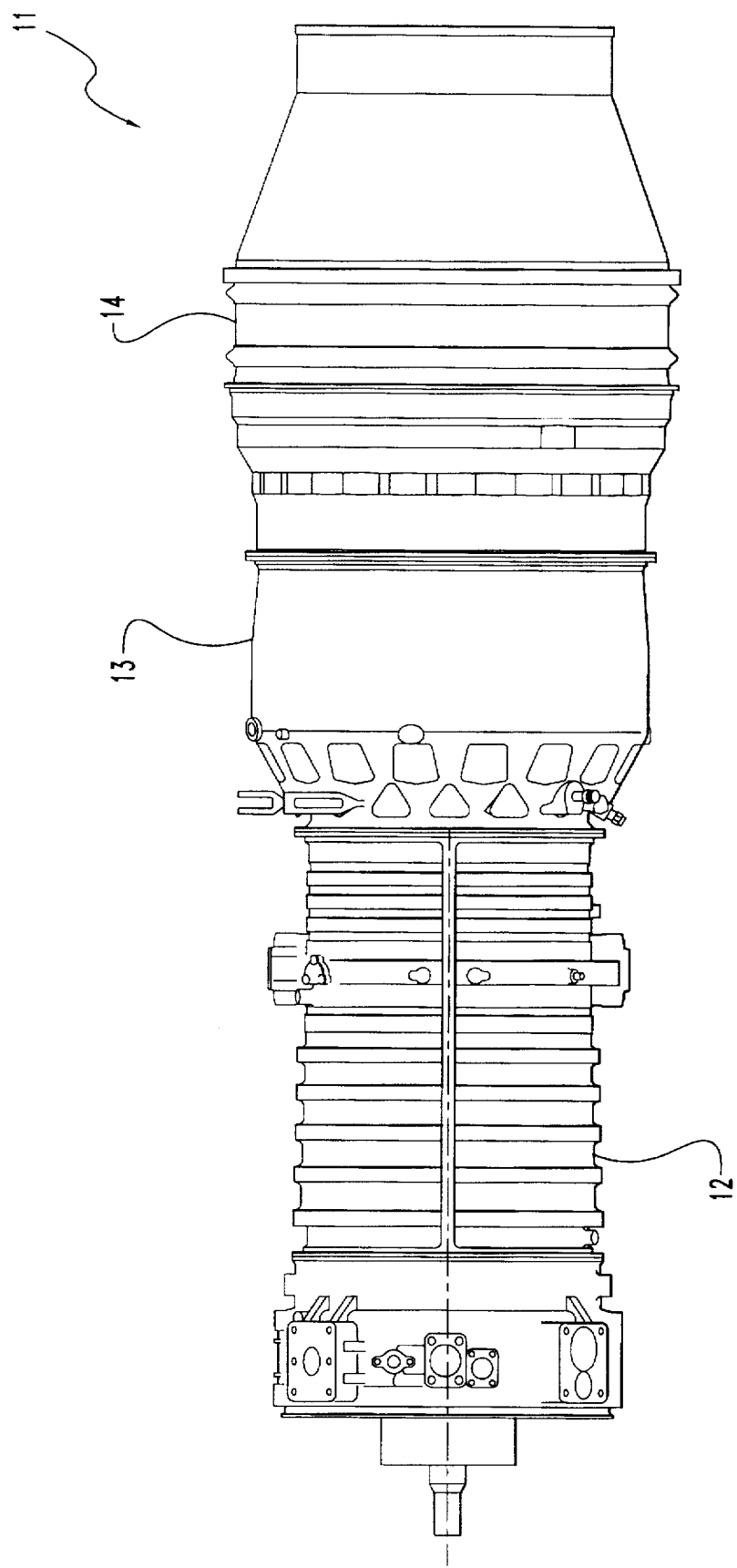
FIG. 2 is an enlarged side elevational view of the gas turbine engine of FIG. 1.

With reference to FIGS. 1 and 2, there is illustrated an aircraft 10 having an aircraft flight propulsion engine 11. It is understood that an aircraft is generic and includes helicopters, tactical fighters, trainers, missiles, and other related apparatuses. In the preferred embodiment the flight propulsion engine 11 defines a gas turbine engine integrating a compressor 12, a combustor 13, and a power turbine 14. Gas turbine engines are one form of high speed rotating machine. In the present invention it is preferred that the turbine has a rotational speed greater than twelve thousand revolutions per minute, and the compressor has a rotational speed greater than twelve thousand revolutions per minute. However, other rotational speeds are contemplated herein. It is important to realize that there are a multitude of ways in which the components can be linked together. Additional compressors and turbines could be added with intercoolers connecting between the compressors and reheat combustion chambers could be added between the turbines. Further, gas turbine engines are equally suited to be used for industrial application. Historically, there has been widespread application of industrial gas turbine engines, such as pumping sets for gas and oil transmission lines, electricity generation, and naval propulsion.

Figure 3A:
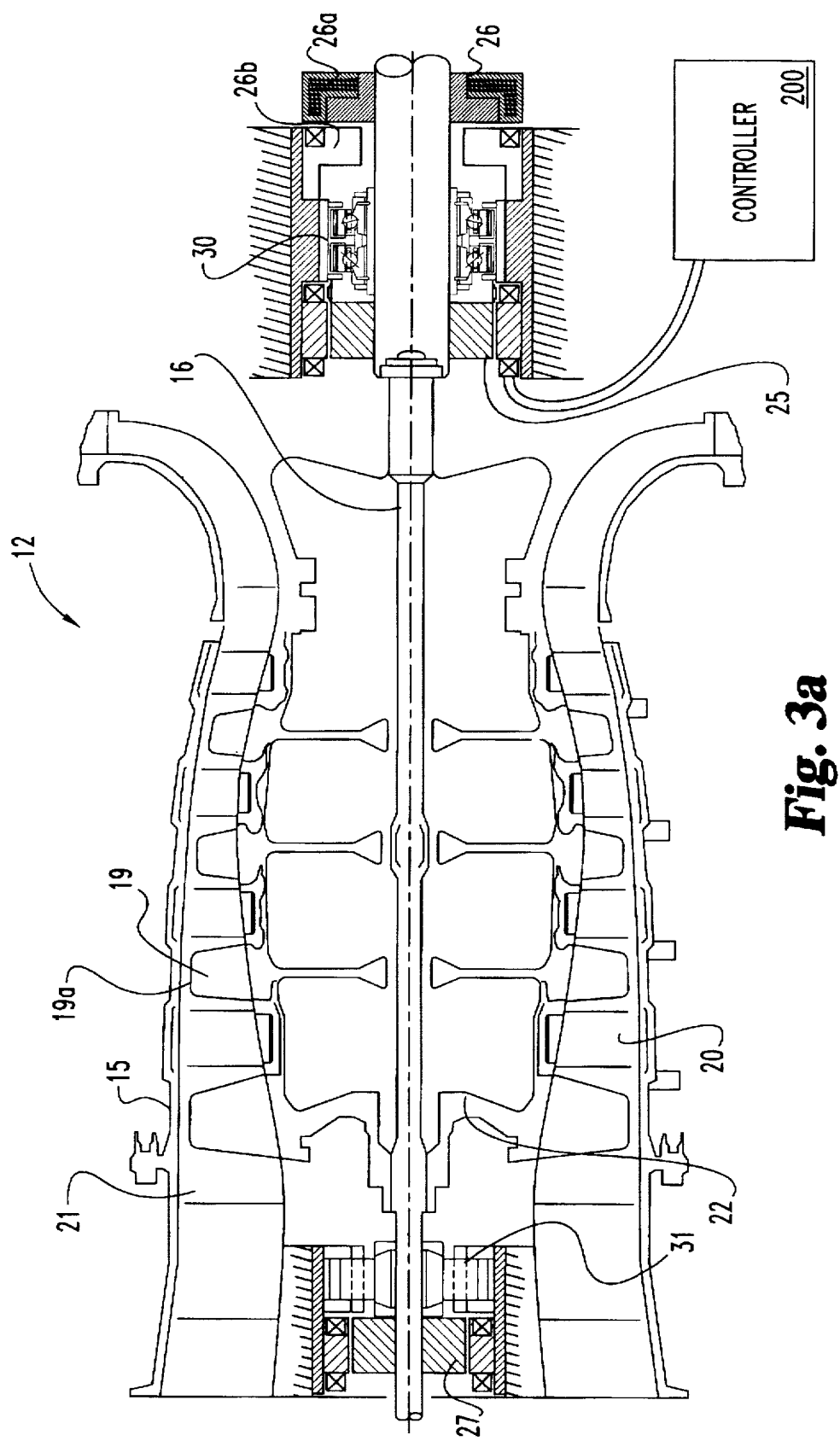
FIG. 3a is a meridional plain sectional view of the compressor comprising a portion of the FIG. 2 gas turbine engine according to one embodiment of the present invention.

With reference to FIG. 3a, there is illustrated the axial flow compressor 12 having a mechanical housing 15 and a plurality of airfoil (blades) rows that are fixedly mounted to a rotatable central shaft 16 for pressurizing a fluid. The rows of airfoils 19 include a tip 19a that is maintained radially spaced from the housing 15 in order to provide clearance therebetween. Airfoils 19 being fixedly coupled to a rotor 22 that rotates relative to the housing 15 when the shaft 16 is rotated by power from the turbine 14. A plurality of corresponding stationary airfoil rows 20 (stators) are coupled to the compressor housing 15. The flow of compressible fluid through a passageway 21 within the compressor housing 15 is influenced by the rows of airfoils. In the preferred embodiment the compressible fluid is air. The blade rows being generally designed to behave as diffusers, with a corresponding increase in static pressure from the upstream region to the downstream region.

Figure 4:
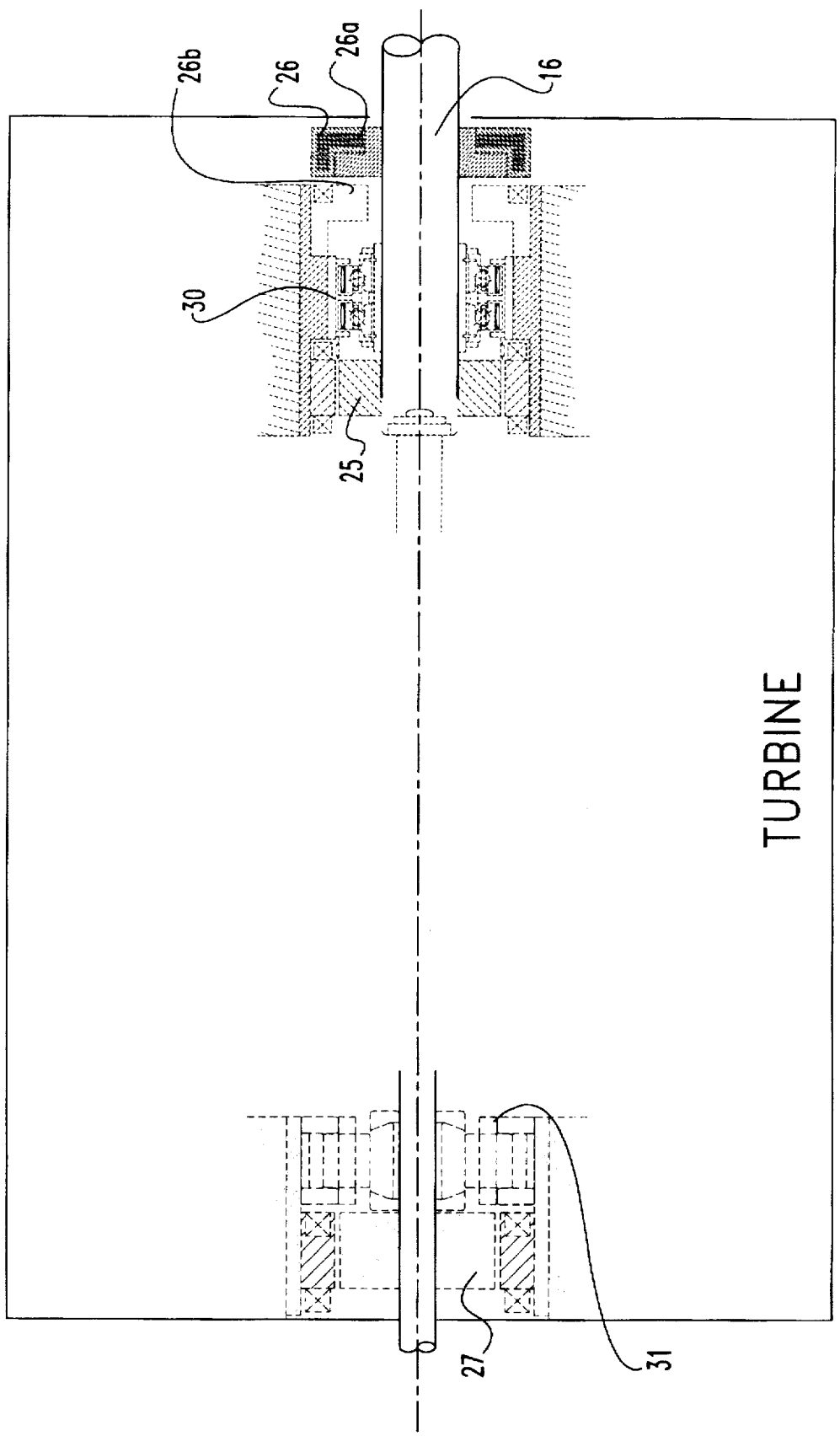
FIG. 4 is an illustrative view of a turbine comprising a portion of the FIG. 2 gas turbine engine according to another embodiment of the present invention.

The central shaft 16 being normally supported by an active electromagnetic bearing system. With reference to FIG. 4, there is illustrated a schematic of a turbine having a rotatable shaft supported by a magnetic bearing system and auxiliary bearing system that is substantially identical to the system set forth for the compressor in FIG. 3a. It is understood that the bearing systems set forth herein are equally applicable to both turbines and compressors within the gas turbine engine. In the preferred embodiment the magnetic bearing system is a five axis system. The use of magnetic bearings instead of conventional oil lubrication bearings will allow the engine lubrication system to be removed, resulting in significant system weight reduction, reduced parasitic losses, simplification of the engine design and improved engine reliability through the elimination of bearing wear. Further, the use of magnetic bearings instead of conventional oil lubrication bearings will benefit the environment by eliminating the handling, storing, and disposing of synthetic oils.

A magnetic bearing system can serve as an integrated actuator for a high speed piece of turbomachinery. One of such applications being for a compressor wherein the actuator is utilized to provide compressor active stability control, compressor active tip clearance control, and for the active control of rotor dynamic instabilities by providing damping. Magnetic bearing systems are well suited for the application of these performance and operability enhancement active control techniques for gas turbine engines. An allowed and commonly owned U.S. patent application Ser. No. 08/396, 014, entitled MAGNETIC BEARINGS AS ACTUATION FOR ACTIVE COMPRESSOR STABILITY CONTROL is incorporated herein by reference.

In one form of the present invention the magnetic bearing system includes a first active magnetic radial bearing 25 positioned at one end of shaft 16 and a second magnetic radial bearing 27 positioned at the other end of the shaft 16. The magnetic bearings of the present invention are active electromagnetic bearings. An active electromagnetic thrust bearing 26 is positioned so as to act on shaft 16 and counteract axial thrust loading. Active electromagnetic thrust bearing 26 includes a high speed high temperature hybrid thrust disk rotor 26a coupled to shaft 16, and a stator 26b coupled to the mechanical housing 15. Hybrid thrust disk rotor 26a being axially spaced from rotor 22. The stator includes a metal core and a wire coil connected to a power supply. When the electromagnetic is turned on, the power supply induces a current in the coil which produces the magnetic flux field, which in turn intercepts the thrust disk rotor 26a. The active electromagnetic bearings 25, 26, and 27 have the capability to adapt to the change in requirements for the rotor system, diagnose engine conditions, minimize blade tip clearance and further provide stability control. Electromagnetic bearings 25, 26, and 27 are connected to a controller 200 that provides the functionality necessary to control the magnetic bearings.

Figure 5:
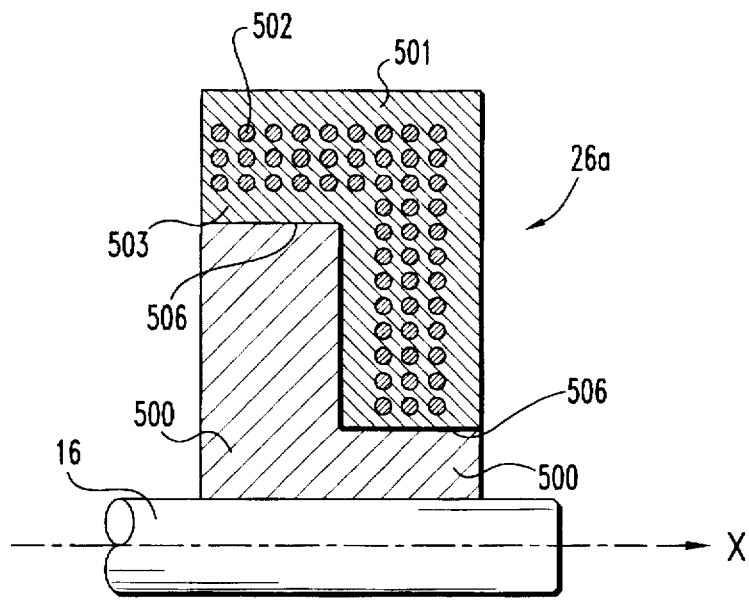

With reference to FIG. 5, there is an illustrated a sectional view of the preferred embodiment of electromagnetic thrust disk rotor 26a coupled to the rotatable shaft 16. Electromagnetic thrust disk rotor 26a being a substantially annular ring member that is press fit onto the shaft 16. In the preferred embodiment the electromagnetic thrust disk rotor being symmetrical about an axial centerline X. The electromagnetic thrust disk rotor 26a having two portions formed of different materials; a magnetically responsive/attractive portion 500, and a high strength support portion 501. The magnetically responsive portion 500 upon being subjected to the magnetic field is attracted towards the stator 26b. High strength support portion 501 providing mechanical strength to the rotor disk 26a for resisting the non-magnetic forces applied to disk 26a. Further, the high strength support portion 501 being formed of a material having magnetic permeability less than the magnetically responsive/attractable portion 500.

In a preferred embodiment the high strength support portion 501 is made of a composite material, and more specifically a high specific strength material system. In a more preferred embodiment the high strength support portion 501 is a high specific strength metal matrix composite (MMC), which comprises a plurality of fibers 502 extending circumferentially around the high strength support portion. It is understood that the quantity, size and spacing of the fibers 502 shown herein, is merely illustrative and is not intended to be a limitation as to the spacing, quantity or fiber size. The plurality of circumferentially extending fibers 502 are spaced from one another in both an axial and radial direction. In a most preferred embodiment the plurality of fibers 502 are of a silicon carbide composition, and the plurality of fibers 40 are held together by a titanium alloy 503. Further the titanium alloy 503 forms an exterior covering for the plurality of silicon carbide fibers 502 and titanium alloy which comprises the high strength support portion 501.

The high strength support portion 501 is manufactured by laying up a plurality of circumferentially extending silicone carbide fibers 502, which are separated by a titanium alloy foil. The network of silicon carbide fibers 502 and titanium alloy foil is then hot isostatically pressed to produce the high strength support portion 501. The metal matrix composite high strength support portion 501 being extremely resistant to compressive loads and their attendant compressive stress. It is understood that the process of making a metal matrix composite part is generally well known to those skilled in the art. Further, in alternate forms of the present invention the high strength support portion 501 is constructed of other high specific strength material systems including organic matrix composites (OMC) and ceramic matrix composites (CMC).

The high strength support portion 501 being connected to the circumferential surface 506 of the magnetically responsive/attractable portion 500. In the preferred embodiment the high strength support portion 501 is press fit with the magnetically responsive/attractable portion 500. The coefficient of thermal expansion for the metal matrix composite is in the range of about 4–6×10–6 in/in per degree fahrenheit.

The magnetically responsive/ attractable portion 500 being formed of a highly magnetically responsive/ attractable material. More particularly, the material utilized for the magnetically responsive portion is a high permeability magnetic material. In the most preferred embodiment the material is a Cobalt-Iron sold under the tradename HIPERCO 27. The material having a coefficient of thermal expansion of about 6.0×10–6 in/in per degrees fahrenheit. It is understood that other materials are contemplated herein provided they have similar properties to the above material, such as good magnetic properties at elevated temperatures.

In one form In one form of the present invention the magnetically responsive portion 500 forming a unitary solid disk having a axial width corresponding to the axial width of the high strength support portion 501. The non-magnetic forces acting upon the responsive portion 500 are transferred to the high strength support portion 501, such that it is loaded in compression. Further, the disk 26a being operable at steady state temperatures of up to about twelve hundred degrees fahrenheit. In an alternate form of the present invention the magnetically responsive portion being a laminated structure.

Figure 6:
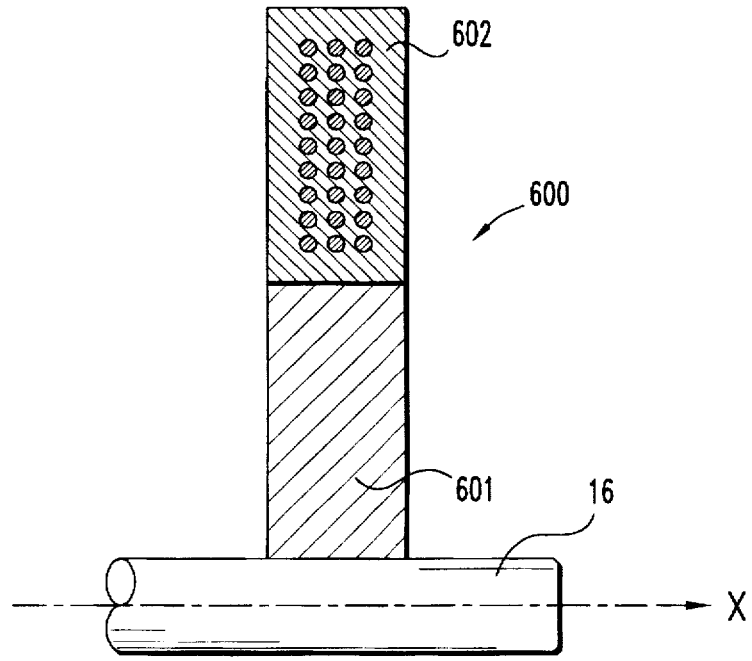
FIG. 6 is an enlarged partial sectional view of an alternative embodiment of the magnetic thrust bearing rotor of the present invention.

With reference to FIG. 6, there is illustrated an alternative embodiment of the magnetic bearing thrust disk 600. Disk 600 being substantially similar to rotor disk 26a, with the major distinctions being related to geometric differences. The magnetic bearing thrust disk 600 having a magnetically responsive/attractable portion 601 and a high strength portion 602. Further, the high strength portion 602 being an annular ring that is mounted around the circumference of the magnetically responsive/attractable portion 601. It is understood that other geometric configurations are contemplated herein provided that any load transferred between the abutting portions is a substantially compressive force.

Each of the active electromagnetic radial bearings 25 and 27 include; stators 25a, 27a, and rotors 25b and 27b. The nominal clearance (air gap) between the magnetic radial bearing stators and rotors is in the range of about 0.010–0.012 inches. However, it is understood that this clearance between the magnetic radial bearing rotors and stators will change as the magnetic bearings fail or there is peaked loading. Further, the air gap changes will also occur during the active closed loop control of the magnetic bearing system.

In one embodiment the maximum static load that each of the magnetic radial bearings 25 and 27 can support is about 500 pounds. Additionally, the maximum dynamic load that each of the magnetic radial bearings 25 and 27 can support is about 500 pounds. It is understood that other bearing support loads are contemplated herein; these loads being dependent upon the space available for the bearings, bearing size, bearing material and other characteristics of the bearing.

Figure 7:
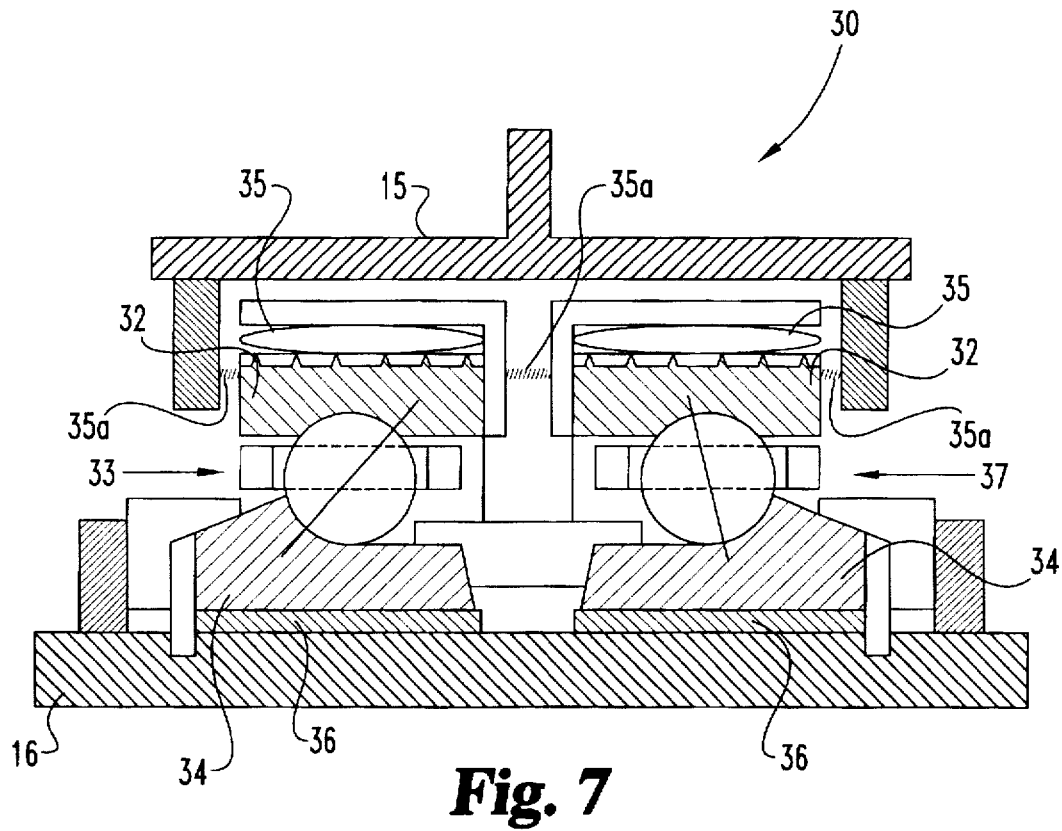
FIG. 7 is an enlarged side elevational view in section of the auxiliary thrust bearing comprising a portion of the FIG. 3a bearing system.

Aircraft gas turbine engines are subject to a wide range of dynamic and static loading. Some of these loads, especially maneuvering and landing loads, can be quite severe and in the magnitude of up to about twenty times the earth's gravitational pull. In one embodiment a lightweight high temperature combination bearing is utilized for sharing the applied load acting on shaft 16. Auxiliary bearing units 30 and 31 run at the shaft speed of the respective component of the gas turbine engine and load share as needed with the magnetic bearing system. Referring to FIG. 7, there is illustrated an enlarged side elevational view in section of the auxiliary bearing unit 30 that is a dry solid lubricated rolling element type bearing. However, other lubrication schemes are contemplated herein. Bearing 33 comprising a portion of bearing unit 30 and has an outer bearing race 32 coupled to the housing 15, and in one embodiment is a ball bearing. The inner bearing race 34 of bearing 33 being coupled to the rotatable shaft 16. A compliant interface 35 couples the outer bearing race 32 to the housing 15 and a second compliant interface 36 couples the inner bearing race 34 to shaft 16. Compliant interfaces 35 and 36 function to soft mount the bearing 33 of auxiliary bearing unit 30 between the rotatable shaft 16 and the housing 15. The light loading of the outer race of bearing 33 allows the inner bearing race 34 and the plurality of rolling balls to continuously rotate with the rotor shaft 16.

The compliant interfaces 35 and 36 are elastic enough to permit the shaft 16 to seek its own dynamic center yet stiff enough to limit the radial and axial movement of the shaft. Compliant interfaces 35a each provide a light preload on the shaft, and in one embodiment the preload is about 50 pounds. Compliant interfaces 35a are springs having a spring rate of about 5000 lbs/in. It is understood that the bearing preload on the shaft can be adjusted as necessary for tuning the systems rotordynamics.

Figure 9:
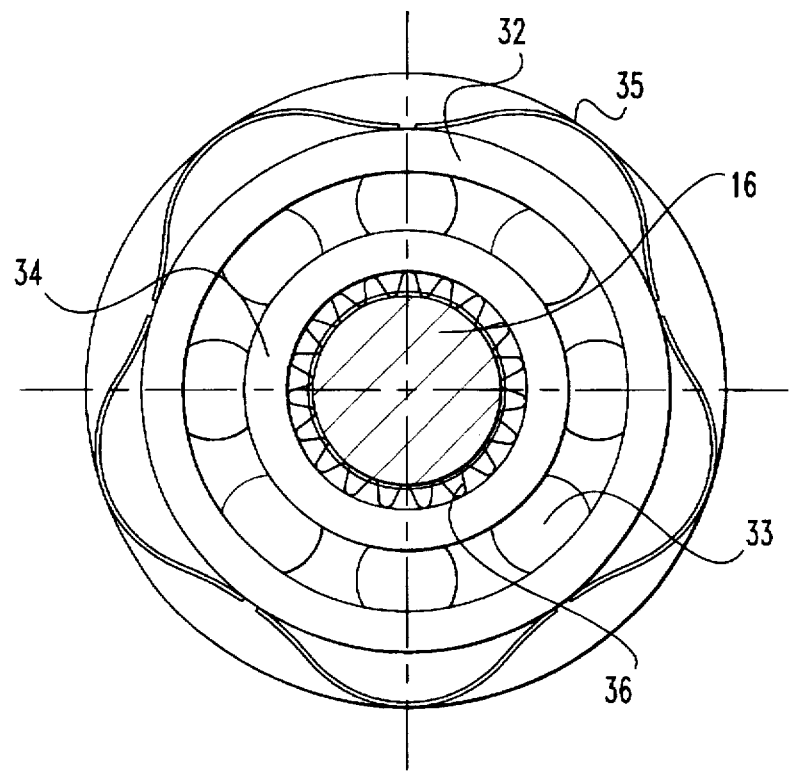
FIG. 9 is an illustrative end view showing the compliant interfaces positioning the auxiliary bearings between the rotor shaft and the engine housing.

With reference to FIG. 9, there is illustrated an end view of one embodiment of the bearing 33 being soft mounted between the rotatable shaft 16 and the mechanical housing 15. Compliant interfaces 35 and 36 are springs and more particularly compliant interface 35 is a leaf spring, and compliant interface 36 is a continuous wave spring. In one form the spring rate for compliant interface 35 is about one hundred thousand lbs/in, and for compliant interface 36 is about fifty thousand lbs/in. It is understood that the compliant interfaces are not intended herein to be limited to springs, and that the appropriate spring rates are dependent upon the particular system parameters.

The soft mounting of the bearing 33 between the housing 15 and the shaft 16 enables a substantially stable transition from the all magnetic bearing support of rotor shaft 16 to a physically contacting mechanically assisted support of the shaft. The auxiliary bearing unit 30 sharing the load with the magnetic forces from the magnetic bearing to support the shaft 30. While the shaft 16 is normally supported by the magnetic force from the magnetic bearing and rotates about its centerline the auxiliary bearing units 30 and 31 provide a light load on the shaft and rotate at the shaft speed. Upon the failure of a magnetic bearing and/or the onset of a maneuver or other activity that generates a peak load the auxiliary bearing units 30 and 31 share the load on the shaft 16. Further, the auxiliary bearing units provide static support for the shaft 16 when the shaft is stationary.

Upon the radial displacement of shaft 16 about five to seven thousandths of an inch the compliant interface 35 bottoms out and the outer bearing race 32 becomes hard coupled to housing 15. The compression of the compliant interface 35 allows the continued transfer of the bearing support from the magnetic bearing system to the auxiliary bearing units 30 and 31, and if necessary the auxiliary bearing units carry the complete shaft load to enable the flight mission to be completed. Soft coupling of the auxiliary units 30 and 31 to shaft 16 allows for the accommodation of the considerable differences in the thermal expansion coefficients between the shaft 16 and the inner bearing races.

In one embodiment the auxiliary bearing unit 30 includes two angular contact ball bearings 33 and 37. The second ball bearing 37 being mounted substantially identical to the first ball bearing 33. It is understood that the two ball bearings 33 and 37 are substantially identical and like figure numbers will be utilized herein to represent like elements. The second ball bearing 37 being mounted at it's inner bearing race 34 through a compliant interface 36 to shaft 16 and having its outer bearing race 32 coupled to the housing 15 by a compliant interface 35. One of the ball bearings having a high contact angle to react the greater thrust load, and the other bearing having a low contact angle to react reverse thrust loads and corresponding radial loads. The auxiliary bearing unit 30 accommodates preloading and limits the axial and radial movement of the shaft 16 to prevent contact with the magnetic bearing system.

Figure 7A:
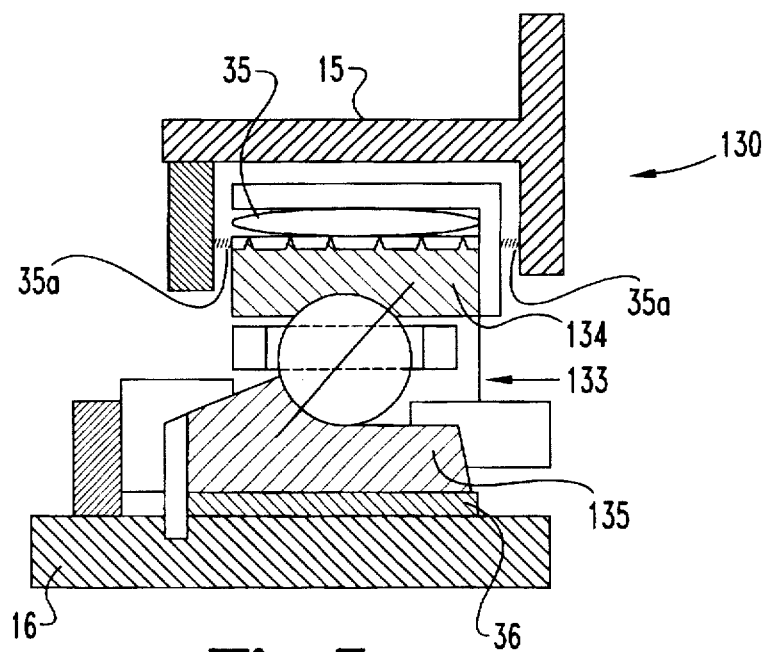
FIG. 7a is a side elevational view in section of an alternate embodiment of the auxiliary thrust bearing.

With reference to FIG. 7a, there is illustrated an alternative embodiment 130 of the auxiliary bearing unit. The auxiliary bearing unit 130 is designed and constructed for providing auxiliary thrust and radial bearing support for shaft 16. The auxiliary bearing unit 130 is substantially similar to auxiliary bearing unit 30, but only includes one ball type rolling bearing element. The bearing element 133 being a ball type element wherein the plurality of balls roll between an inner bearing race 135 and an outer bearing race 134. The auxiliary bearing unit 130 being soft mounted to shaft 16 and housing 15 in substantially the same manner as bearing unit 30.

The bearing utilized in the auxiliary bearings units are rolling element ball type bearings. In one form of the present invention the bearings are ceramic bearings (silicone nitride) having a ceramic inner bearing race, a ceramic outer bearing race, and ceramic rolling ball elements. In another embodiment the bearing units are hybrid bearings having a steel alloy inner and outer bearing race and a ceramic rolling element. The bearing units 30 and 130 and their related components are dry solid lubricated.

Figure 8:
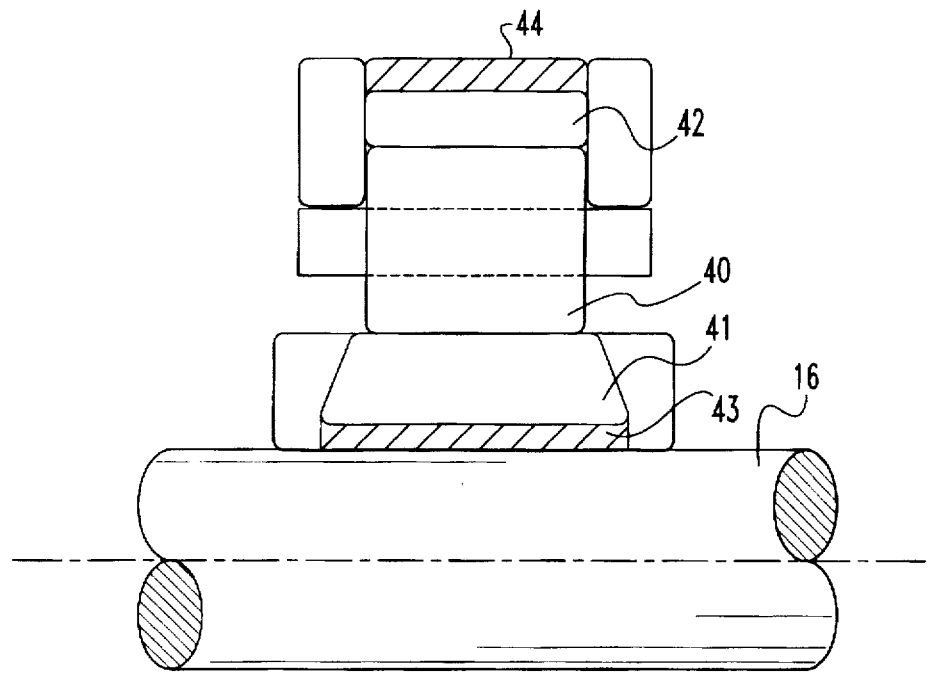
FIG. 8 is an enlarged side elevational view in section of the auxiliary radial bearing comprising a portion of the FIG. 3a bearing system.

Positioned at the other end of the shaft 16 for load sharing with radial magnetic bearing 27 is auxiliary bearing unit 31. In the one embodiment the auxiliary bearing unit 31 is a radial rolling element bearing. With reference to FIG. 8, there is illustrated an enlarged partial sectional view of the radial roller bearing unit 31. The rolling element 40 comprising a cylindrical bearing element for supporting the radial load transmitted from shaft 16 that is not carried by the magnetic bearing system. The cylindrical roller bearing 40 rolls between an inner bearing race 41 coupled to shaft 16 and an outer bearing race 42 coupled to housing 15. The auxiliary bearing unit 31 being mounted between shaft 16 and housing 15 by compliant interfaces 43 and 44. The compliant interfaces 43 and 44 are designed to soft mount the bearings between the shaft 16 and the housing 15 in a manner substantially identical to that for bearing units 30 and 130.

The bearing utilized in the auxiliary bearings units 31 are rolling element roller type bearings. In one form of the present invention the bearings are ceramic bearings (silicone nitride) having a ceramic inner bearing race, a ceramic outer bearing race, and ceramic rolling roller elements. In another embodiment of the present invention the bearing units include hybrid bearings having a steel alloy inner and outer bearing race and a ceramic rolling element. The bearing unit 31 and their related components are dry solid lubricated.

Figure 3B:
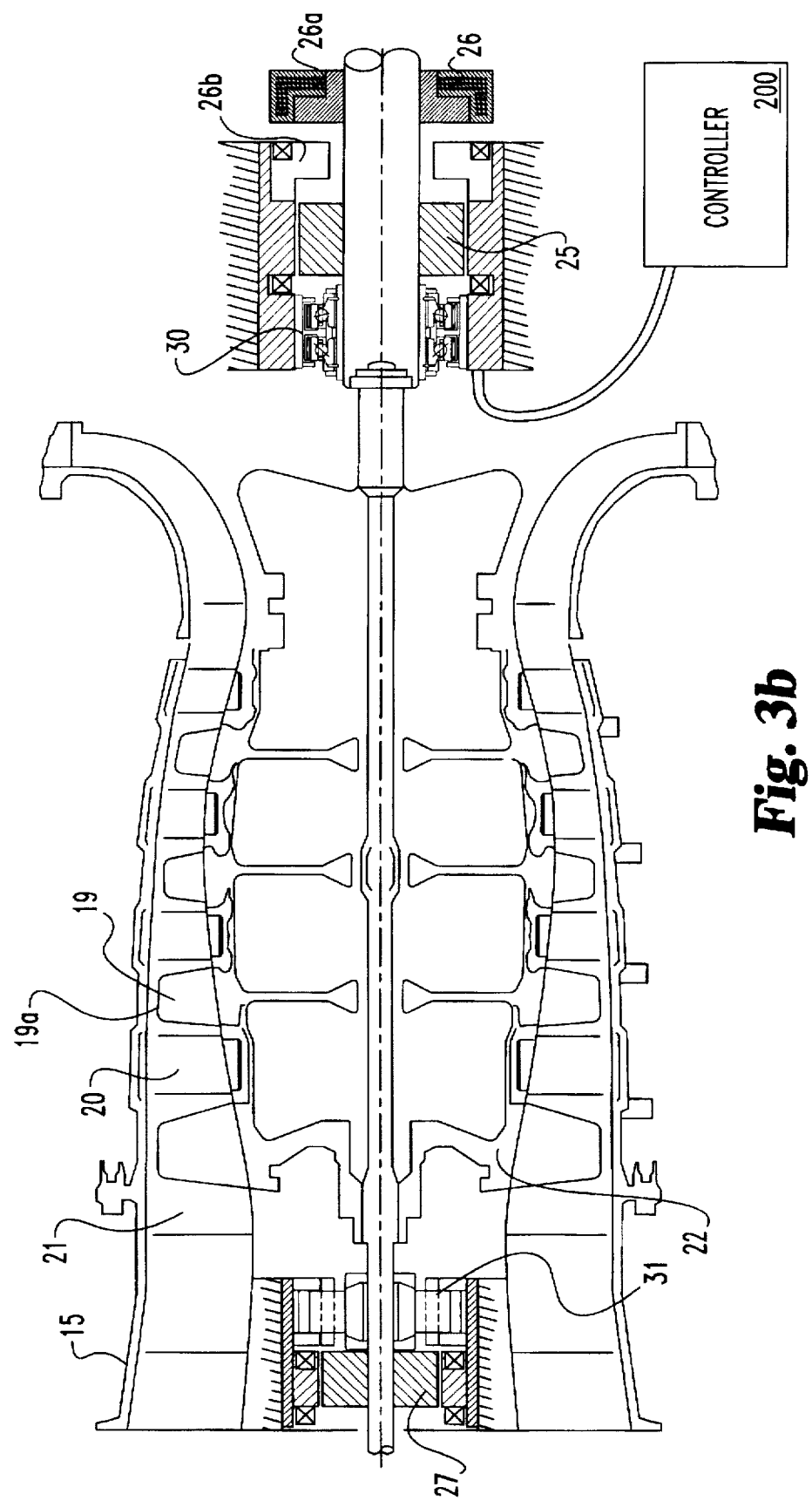
FIG. 3b is a meridional plain sectional view of the compressor comprising a portion of the FIG. 2 gas turbine engine according to another form of the present invention.

With reference to FIG. 3b, there is illustrated another embodiment of the combination bearing system. The combination bearing system is substantially identical to the FIG. 3a system, with one significant change relating to the relocation of the auxiliary bearing unit 30 from being tucked in the magnetic bearing 25 to being spaced therefrom. The auxiliary bearing unit 30 has been axially offset to optimize the gas turbine engine's rotordynamics. It is understood that the position of the combination bearing components will allow the tuning of the engine rotor critical speeds.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
 a gas turbine engine; and
 a magnetic thrust bearing rotor within said engine, comprising:
  a rotatable magnetically attractable member; and
  a high specific strength composite ring positioned circumferentially about said magnetically attractable member for resisting non-magnetic forces applied to said magnetically attractable member.

2. The combination of claim 1, wherein said composite ring is made from one of a metal matrix composite, a ceramic matrix composite, and a organic matrix composite.

3. The combination of claim 1 wherein said composite ring is made from titanium and silicon carbide.

4. The combination of claim 3, wherein said ring includes a plurality of circumferentially extending silicon carbon fibers.

5. The combination of claim 4, wherein:
 the non-magnetic forces applied to said magnetically attractable member are transmitted to said composite ring so as to apply a compressive load to said ring;
 said magnetic thrust bearing is actively controlled
 said gas turbine engine further includes a mechanical housing and a shaft rotatable therein;
 said shaft having a plurality of airfoils coupled thereto; and
 said magnetically attractable member connected to said shaft.

6. The combination of claim 4, wherein said gas turbine engine has a turbine component and a compressor component, said components having airfoils therein that are rotatable at speeds greater than twelve thousand revolutions per minute.

7. The combination of claim 1, wherein the coefficient of thermal expansion of said magnetically attractable member is equal to or greater than the coefficient of thermal expansion of said composite ring.

8. The combination of claim 1, wherein said composite ring is press fit to said magnetically attractable.

9. The combination of claim 1, wherein the non-magnetic forces applied to said magnetically attractable member are transmitted to said composite ring so as to load at least a portion of said ring in compression.

10. The combination of claim 1, wherein the magnetic permeability of said composite ring is less than the magnetic permeability of said magnetically attractable member.

11. The combination of claim 1, wherein said magnetic thrust bearing is actively controlled.

12. The combination of claim 1, wherein:
 said gas turbine engine further comprises a housing and a shaft rotatable therein; and said magnetically attractable member coupled to said shaft.

13. The combination of claim 12, which further includes a stator coupled to said mechanical housing from which a magnetic flux field emanates to intercept said magnetically attractable thrust bearing rotor.

14. The combination of claim 13, which further includes an auxiliary thrust bearing coupling said shaft to said housing.

15. The combination of claim 1, wherein said rotor is operable up to approximately 1200 degrees Fahrenheit.

16. In combination:
a gas turbine engine;
a mechanical housing within said gas turbine engine;
a shaft rotatable within said housing; and
an active electromagnetic thrust bearing within said mechanical housing, said active electromagnetic thrust bearing having a magnetically attractable rotor coupled to said shaft and being operable at up to 1200 degrees fahrenheit.

17. The combination of claim 16 wherein said rotor comprises a high strength portion and a magnetically responsive/attractive portion.

18. The combination of claim 17, wherein said high strength portion is formed of a high specific strength material system.

19. The combination of claim 18, wherein said high strength portion is made from one of a metal matrix composite, a ceramic matrix composite, and a organic matrix composite.

20. The combination of claim 18, wherein said high strength portion further includes a plurality of fibers extending circumferentially around said high strength support portion.

21. The combination of claim 20, wherein said plurality of fibers are made of silicon carbide, and wherein said plurality of fibers are held relative to one another by titanium.

22. The combination of claim 21, wherein said plurality of fibers are surrounded by titanium.

23. The combination of claim 17, wherein the thermal expansion of said magnetically responsive/attractive portion is approximately equal to or greater than the thermal expansion of said high strength portion.

24. The combination of claim 17, wherein the magnetic permeability of said high strength portion is less than the magnetic permeability of said magnetically responsive/attractive portion.

25. The combination of claim 17, wherein said high strength portion is positioned circumferentially along said magnetically responsive/attractive portion.

26. The combination of claim 16, which further includes a controller for actively controlling said thrust bearing.

27. The combination of claim 26, further comprising a mechanical auxiliary bearing attached to said housing and coupled to said shaft.

28. In combination:
a gas turbine engine; and
an active magnetic thrust bearing within said gas turbine engine, comprising:
electromagnetic field means for generating a magnetic field within said apparatus;
a rotatable magnetically attractable disk that is subjected to said magnetic field; and
a high strength support member formed of a different material than said disk, said support member circumferentially connecting to and rotatable with said disk for resisting non-magnetic forces applied to said disk.

29. The combination of claim 28, wherein said support member is made from a metal matrix composite, a ceramic matrix composite, or an organic matrix composite.

30. The combination of claim 28, wherein said support member is made from titanium and silicon carbide.

31. The combination of claim 28, which further includes a plurality of fibers surrounded by a metal.

32. The combination of claim 31, wherein said plurality of fibers are formed of silicon carbine, and wherein said metal is titanium, and further wherein said plurality of fibers and said titanium are hot isostatically pressed.

33. The combination of claim 28, wherein the thermal expansion of said magnetically attractable disk is approximately equal to or greater than the thermal expansion of said support member.

34. The combination of claim 28, wherein said support member is adapted to receive a compressive load from said magnetically attractable disk.

35. The combination of claim 28, wherein the magnetic permeability of said support member is less than the magnetic permeability of said magnetically attractable disk.

36. The combination of claim 28, wherein:
said gas turbine engine further comprises a mechanical housing;
said mechanical housing having a shaft rotatable therein; and
an auxiliary bearing attached to the housing and coupled to the shaft.

37. The combination of claim 28, wherein said high strength support member is operable up to approximately 1200 degrees Fahrenheit.

38. In combination:
a gas turbine engine;
a rotatable member within said gas turbine engine, said rotatable member formed of a high magnetic permeable material; and
a high specific strength ring circumferentially positioned about said rotatable member for resisting non-magnetic forces applied to said rotatable member, said high specific strength ring formed of a material having a magnetic permeability less than said rotatable member.

39. The combination of claim 38, wherein said high specific strength ring is made from a metal matrix composite, ceramic matrix composite, or organic matrix composite.

40. The combination of claim 39, wherein the coefficient of thermal expansion of said rotatable member is approximately equal to or greater than the coefficient of thermal expansion of said high specific strength ring.

41. The combination of claim 38, wherein said high specific strength ring is made from titanium and silicon carbide.

* * * * *